US009517495B1

(12) United States Patent
Napurano et al.

(10) Patent No.: US 9,517,495 B1
(45) Date of Patent: Dec. 13, 2016

(54) AUTOMATED SYSTEM FOR FLUSHING ONE OR MORE MOTORS

(71) Applicants: John Joseph Napurano, Fort Lauderdale, FL (US); Daniel Grant Bigelow, Wilton Manors, FL (US)

(72) Inventors: John Joseph Napurano, Fort Lauderdale, FL (US); Daniel Grant Bigelow, Wilton Manors, FL (US)

( * ) Notice: Subject to any disclaimer, the term of this patent is extended or adjusted under 35 U.S.C. 154(b) by 0 days.

(21) Appl. No.: 15/056,233

(22) Filed: Feb. 29, 2016

(51) Int. Cl.
*F16K 1/00* (2006.01)
*B08B 9/032* (2006.01)

(52) U.S. Cl.
CPC ........ *B08B 9/032* (2013.01); *Y10T 137/87877* (2015.04)

(58) Field of Classification Search
CPC .................... Y10T 137/6851; Y10T 137/6991; Y10T 137/7021; Y10T 137/86445; Y10T 137/86911; Y10T 137/87772; Y10T 137/87877
USPC .......................................................... 220/484
See application file for complete search history.

(56) References Cited

U.S. PATENT DOCUMENTS 4,834,143 A * 5/1989 Bayat ................... A01G 25/162 137/382
4,925,045 A * 5/1990 Logsdon ............... E04G 15/061 220/3.94
5,967,188 A * 10/1999 Chien-Chuan ........ F16K 27/003 137/861
7,004,677 B1 * 2/2006 Ericksen .............. A01G 25/162 137/364
2003/0102039 A1 * 6/2003 Marzorati ............. F16K 27/003 137/883
2006/0027273 A1 * 2/2006 Schwarz ................ F16K 11/22 137/883
2006/0116793 A1 * 6/2006 Christiansen .......... A01G 25/16 700/284
2007/0158458 A1 * 7/2007 Wheeler ................ A01G 25/00 239/69
2015/0128659 A1 * 5/2015 Hwang ................... F16K 11/24 68/17 R
2016/0037736 A1 * 2/2016 Rainone ................. A01G 25/16 700/284

* cited by examiner

*Primary Examiner* — R. K. Arundale
(74) *Attorney, Agent, or Firm* — Glenn E. Gold, P.A.; Glenn E. Gold

(57) ABSTRACT

An automated flushing system includes a base having a flow inlet, flow outlets and a flow manifold, the system also including solenoid valves and a pressure switch mounted upon the manifold. The flow manifold includes a main flow channel connected to the flow inlet, and auxiliary flow channels interconnecting the main flow channel with respective ones of the flow outlets so as to provide flow communication in parallel to the flow outlets from the main flow channel. Each solenoid valve extends into a respective auxiliary flow channel and is actuatable between an activated status and a deactivated status to allow and block flow communication of liquid through the respective auxiliary flow channels to a flow outlet. The pressure switch in flow communication with the flow inlet is configured to sense that the pressure of liquid entering the flow inlet is above a preset minimum before initiation of automated flushing system operation.

16 Claims, 14 Drawing Sheets

AUTOMATED SYSTEM FOR FLUSHING ONE OR MORE MOTORS

FIELD OF THE INVENTION

The present invention relates to motor maintenance, and more particularly, is concerned with an automated flushing system adapted, for example, for flushing one or more motors, such as marine outboard motors.

BACKGROUND OF THE INVENTION

A motor of a boat is typically an outboard motor cooled during operation by drawing water for cooling from the body of water in which the boat is operated. The cooling water is circulated through a coolant system of the motor, after which the water is discharged back to the body of water.

This is typically an efficient way to cool a motor assuming that the water is relatively pure. However, impurities, such as salt or other minerals, are frequently present, either dissolved and/or suspended, in the water. After operation of the boat in this way, residues of these impurities may be found to remain within the cooling system of the motor.

Consequently, it is a prudent practice to flush the cooling system of the motor after operation to rinse away residues of these impurities so as to prevent their crystallization in the cooling system. Many boats have multiple motors and so the amount of time and expense to carry out this prudent practice on a frequent basis is a significant issue in motor maintenance.

Accordingly, there remains a need in the art for an innovation that will overcome the deficiencies of past approaches and the problems that remain unsolved.

SUMMARY OF THE INVENTION

The present invention is directed to an innovation that overcomes the deficiencies of the known art and the problems that remain unsolved by providing an automated flushing system adapted, for example, for flushing one or more motors.

In one aspect of the present invention, an automated flushing system includes:

- a base including
  - a flow inlet,
  - a plurality of flow outlets, and
  - a manifold including
    - a main flow channel connected in flow communication with the flow inlet, and
    - a plurality of auxiliary flow channels interconnecting the main flow channel with respective ones of the flow outlets so as to provide flow communication in parallel to the flow outlets from the main flow channel through respective ones of the auxiliary flow channels;
- a plurality of solenoid valves each mounted on the manifold so as to extend into a respective one of the auxiliary flow channels thereof, each solenoid valve being actuatable between an activated status and a deactivated status to allow and block flow communication of a liquid through the respective one of the auxiliary flow channels to a respective one of the flow outlets; and
- a pressure switch mounted on the manifold adjacent and in flow communication with the flow inlet, the pressure switch being configured to sense pressure of a liquid entering the main flow channel from the flow inlet being above a preset minimum pressure as a precondition to initiating operation of the automated flushing system.

In another aspect, the automated system includes a master unit and a slave unit, each of the units incorporating the base and at least some of the plurality of solenoid valves, the units being coupled to one another in a series relationship such that the flow inlet at one end of the slave unit serves as an inlet for the units and one of the flow outlets of the slave unit at an opposite end from the one end is coupled to the flow inlet of the master unit, and wherein the pressure switch is only incorporated in the master unit for sensing the pressure of the liquid entering the main flow channel from the flow inlet of the master unit being above the preset minimum pressure as a precondition to initiating operation of the automated flushing system.

In another aspect, the automated system includes a cover having a bottom rim extending peripherally about the cover. The cover also has an inside surface defining a hollow interior. The cover is adapted to fit over the manifold of the base and enclose the pressure switch and the solenoid valves in the hollow interior with the bottom rim of the cover resting upon a bottom ledge extending peripherally about the base. The bottom rim of the cover has a plurality of recesses formed therein. The recesses are spaced apart and shaped to accommodate the flow inlet and flow outlets of the base such that when the bottom rim of the cover rests upon the bottom ledge of the base the bottom rim of the cover overlies the flow inlet and flow outlets of the base. The base also has a lip extending peripherally about the base and defined in spaced relationship above the bottom ledge. An O-ring seats upon the lip such that when the bottom rim of the cover is resting upon the bottom ledge of the base a seal is formed between the inside surface of the cover and the O-ring.

In another aspect of the present invention, the flow inlet of the base is defined at a first end of the base and respective ones of the flow outlets are defined at opposite sides of the base and at a second end of the base opposite to the first end. Also, the main flow channel at one end is connected to the flow inlet at the first end of the base and extending longitudinally of the base toward the second end of the base.

In another aspect of the present invention, the manifold also includes a plurality of cavities each paired with a respective one of the auxiliary flow channels. Each cavity defines a respective flow-through orifice such that the flow communication provided by each of the auxiliary flow channels also passes through each of the orifices of the cavities paired with the respective one of auxiliary flow channels.

In another aspect of the present invention, each solenoid valve has an upper portion extending above a respective one of the cavities and a lower portion extending into the respective one of the cavities and intersecting the flow-through orifice. Actuation of the upper portion of a respective one of the solenoid valves shifts the upper portion between the activated status and deactivated status and causes the lower portion to correspondingly open and close a respective one of the flow-through orifices.

In another aspect of the present invention, an automated flushing system includes:

- a base including
  - a flow inlet,
  - a plurality of flow outlets, and
  - a manifold including
    - a main flow channel connected in flow communication with the flow inlet, and a plurality of auxiliary flow channels interconnecting the main flow channel with respective ones of the flow outlets so as to provide flow communication in parallel to the flow outlets from the main flow channel through respective ones of the auxiliary flow channels;

a plurality of solenoid valves each mounted on the manifold so as to extend into a respective one of the auxiliary flow channels thereof, each solenoid valve being actuatable between an activated status and a deactivated status to allow and block flow communication of a liquid through the respective one of the auxiliary flow channels to a respective one of the flow outlets;

a pressure switch mounted on the manifold adjacent and in flow communication with the flow inlet, the pressure valve being configured to sense the pressure of a liquid entering the main flow channel from the flow inlet being above a preset minimum pressure as a precondition to initiating operation of the automated flushing system;

a cover having an inside surface defining a hollow interior and being adapted to fit over the manifold of the base and enclose the pressure switch and the plurality of solenoid valves in the hollow interior with the cover resting upon the base; and a control panel coupled to the pressure valve and the solenoid valves for actuating each of the solenoid valves to the activated status to initiate operation of the automated flushing system in response to the pressure valve sensing the pressure of liquid entering the main flow channel from the flow inlet being above the preset minimum pressure.

In another aspect, the automated system includes a master unit and a slave unit, each of the units incorporating the base, the cover and at least some of the plurality of solenoid valves, the units being coupled to one another in a series relationship such that the flow inlet at one end of the slave unit serves as an inlet for the units and one of the flow outlets of the slave unit at an opposite end from the one end is coupled to the flow inlet of the master unit, and wherein the pressure switch and the control panel coupled to the pressure switch are only incorporated in the master unit for actuating each of the solenoid valves to the activated status to initiate operation of the automated flushing system in response the pressure valve sensing the pressure of the liquid entering the main flow channel from the flow inlet of the master unit being above the preset minimum pressure.

In another aspect of the present invention, an automated flushing system includes:

a base including a flow inlet, a plurality of flow outlets, and a manifold including a main flow channel connected in flow communication with the flow inlet, and a plurality of auxiliary flow channels interconnecting the main flow channel with respective ones of the flow outlets so as to provide flow communication in parallel to the flow outlets from the main flow channel through respective ones of the auxiliary flow channels;

a plurality of solenoid valves each mounted on the manifold so as to extend into a respective one of the auxiliary flow channels thereof, each solenoid valve being actuatable between an activated status and a deactivated status to allow and block flow communication of a liquid through the respective one of the auxiliary flow channels to a respective one of the flow outlets;

a pressure switch mounted on the manifold adjacent and in flow communication with the flow inlet, the pressure valve being configured to sense the pressure of liquid entering the main flow channel from the flow inlet being above a preset minimum pressure as a precondition to initiating operation of the automated flushing system;

a cover having an inside surface defining a hollow interior and being adapted to fit over the manifold of the base and enclose the pressure switch and the plurality of solenoid valves in the hollow interior with the cover resting upon the base;

a timer control coupled to the solenoid valves for actuating each of the solenoid valves to the activated status in accordance with a preset sequence; and a start switch being actuatable to initiate operation of the automated flushing system in accordance with the preset sequence of the activated status of the solenoid valves in response to the pressure valve sensing the pressure of the liquid entering the main flow channel from the flow inlet to be above the preset minimum pressure.

These and other aspects, features, and advantages of the present invention will become more readily apparent from the attached drawings and the detailed description of the preferred embodiments, which follow.

BRIEF DESCRIPTION OF THE DRAWINGS

The preferred embodiments of the invention will hereinafter be described in conjunction with the appended drawings provided to illustrate and not to limit the invention, in which.

Like reference numerals refer to like parts throughout the several views of the drawings.

DETAILED DESCRIPTION

Figure 1:
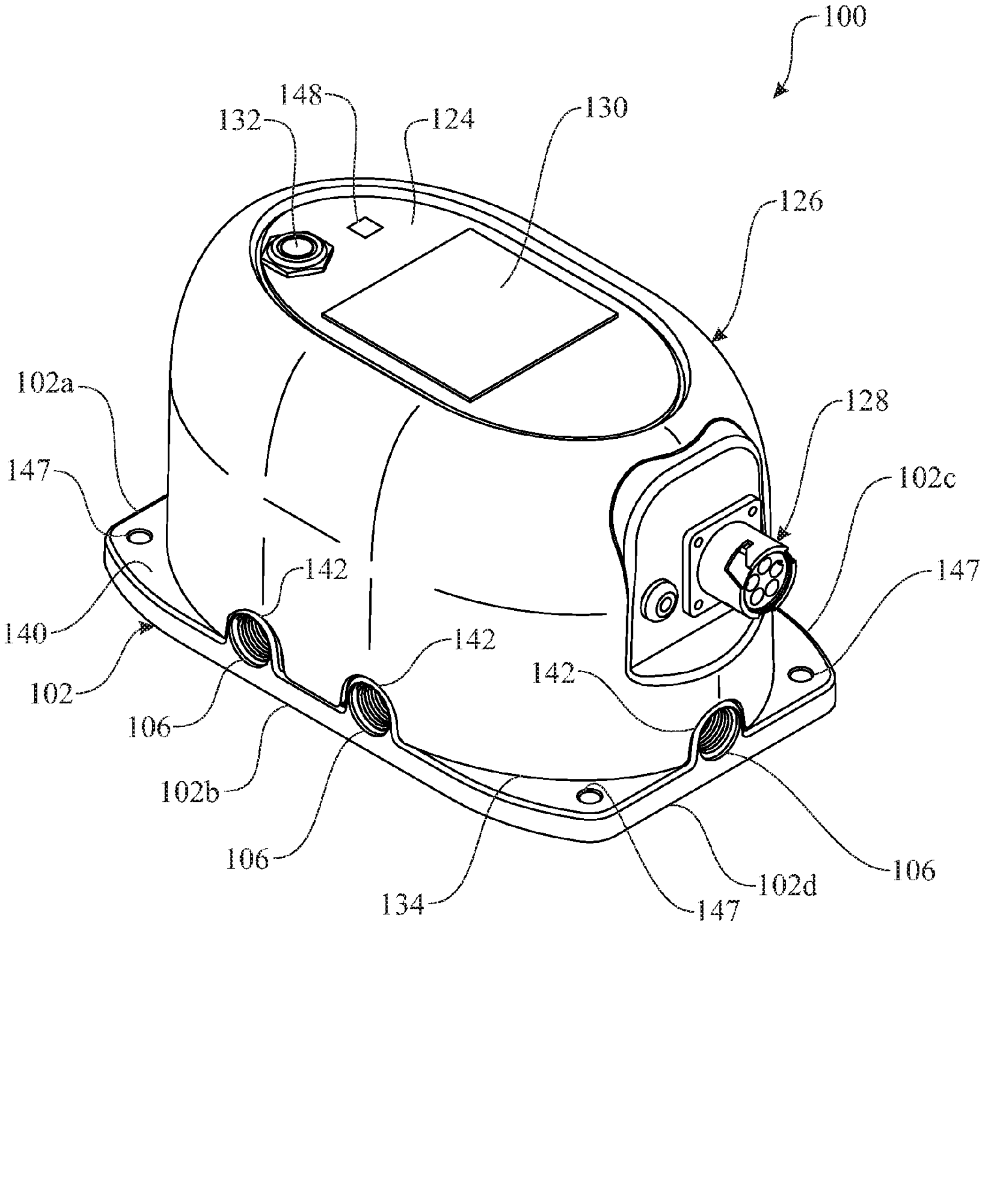
FIG. 1 presents a top isometric view of an exemplary embodiment of an automated flushing system in accordance with aspects of the present invention, being adapted, for example, for flushing one or more outboard motors.
Figure 2:
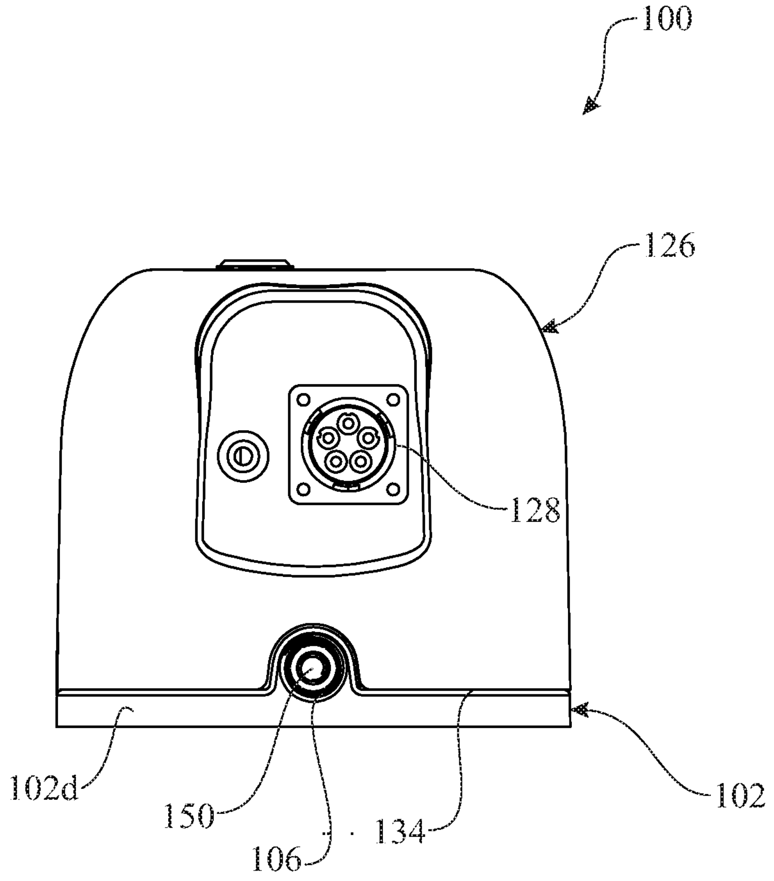
FIG. 2 presents a front view of the automated flushing system originally introduced in FIG. 1.
Figure 3:
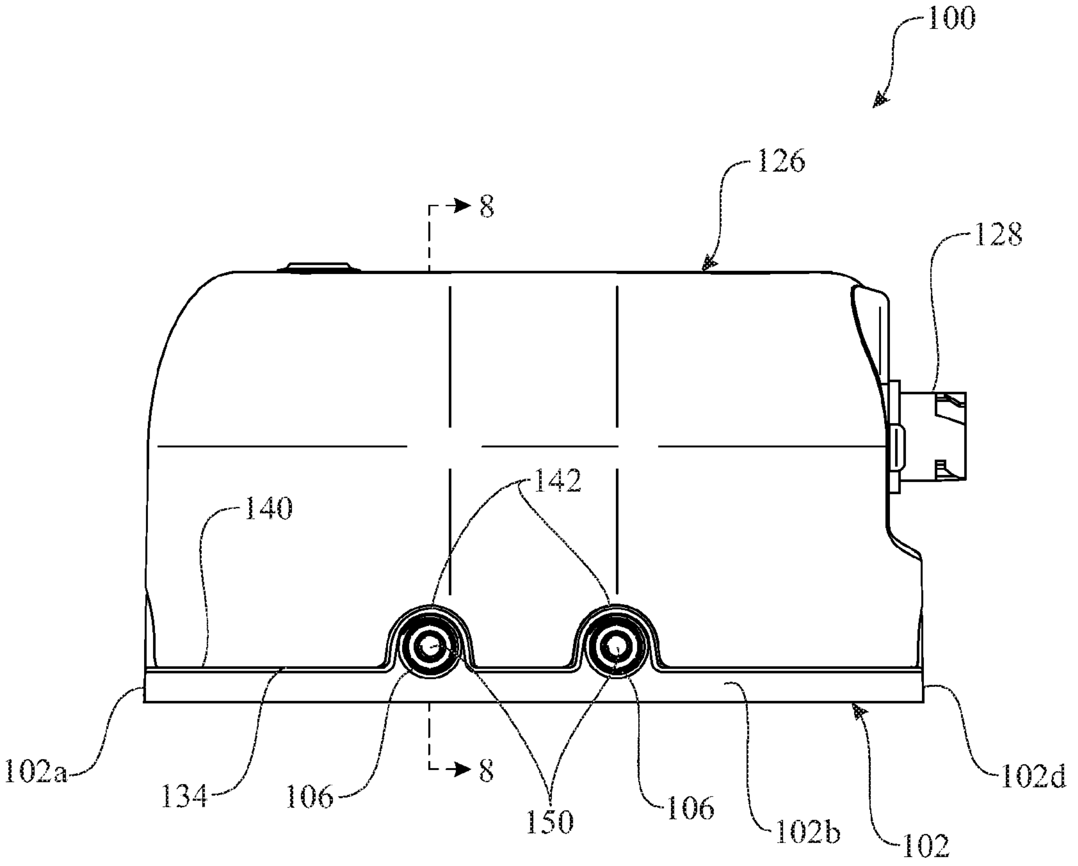
FIG. 3 presents a side elevation view of the automated flushing system originally introduced in FIG. 1.
Figure 4:
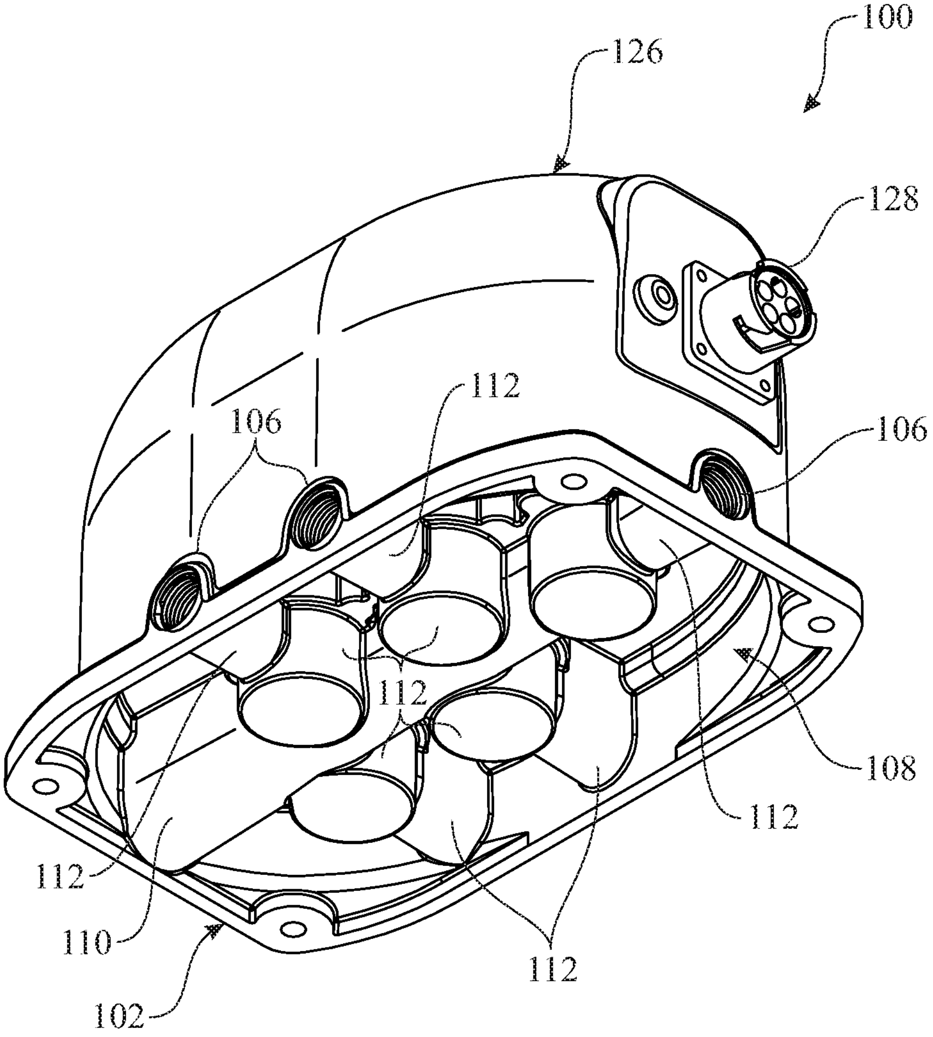
FIG. 4 presents a bottom isometric view of the automated flushing system originally introduced in FIG. 1.
Figure 5:
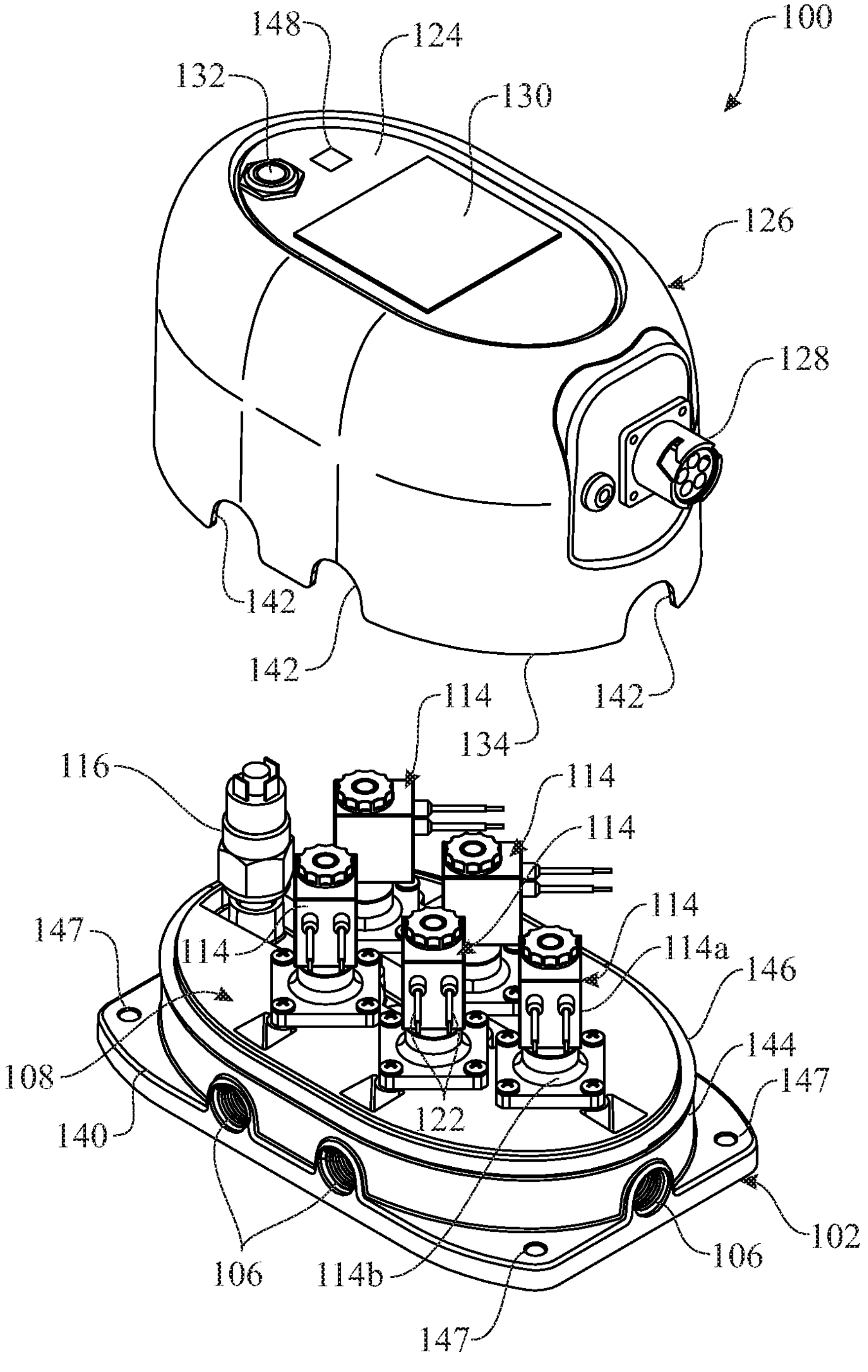
FIG. 5 presents a partially exploded top isometric view of the automated flushing system originally introduced in FIG. 1.
Figure 6:
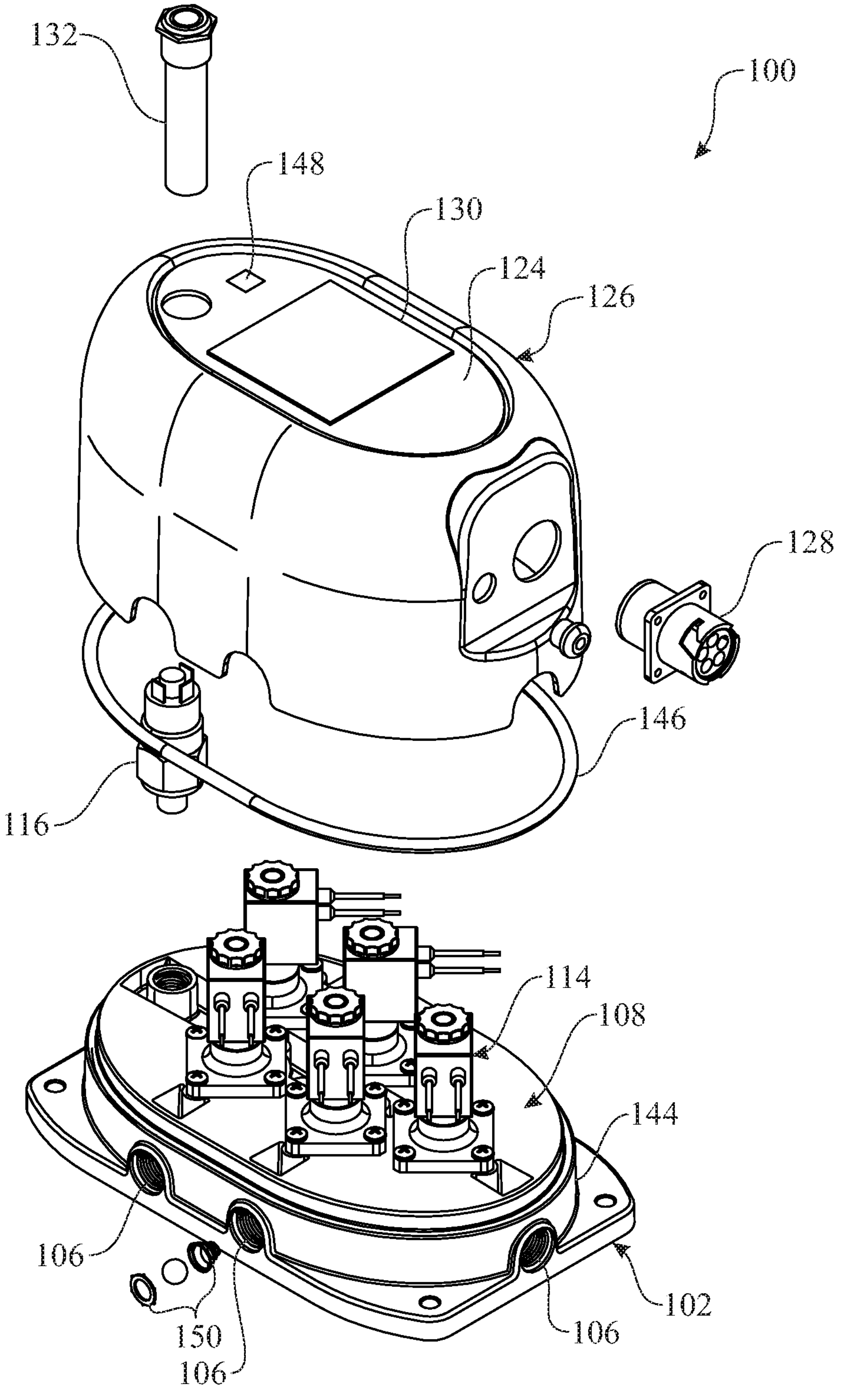
FIG. 6 presents another partially exploded top isometric view of the automated flushing system similar to that of FIG. 5.
Figure 7:
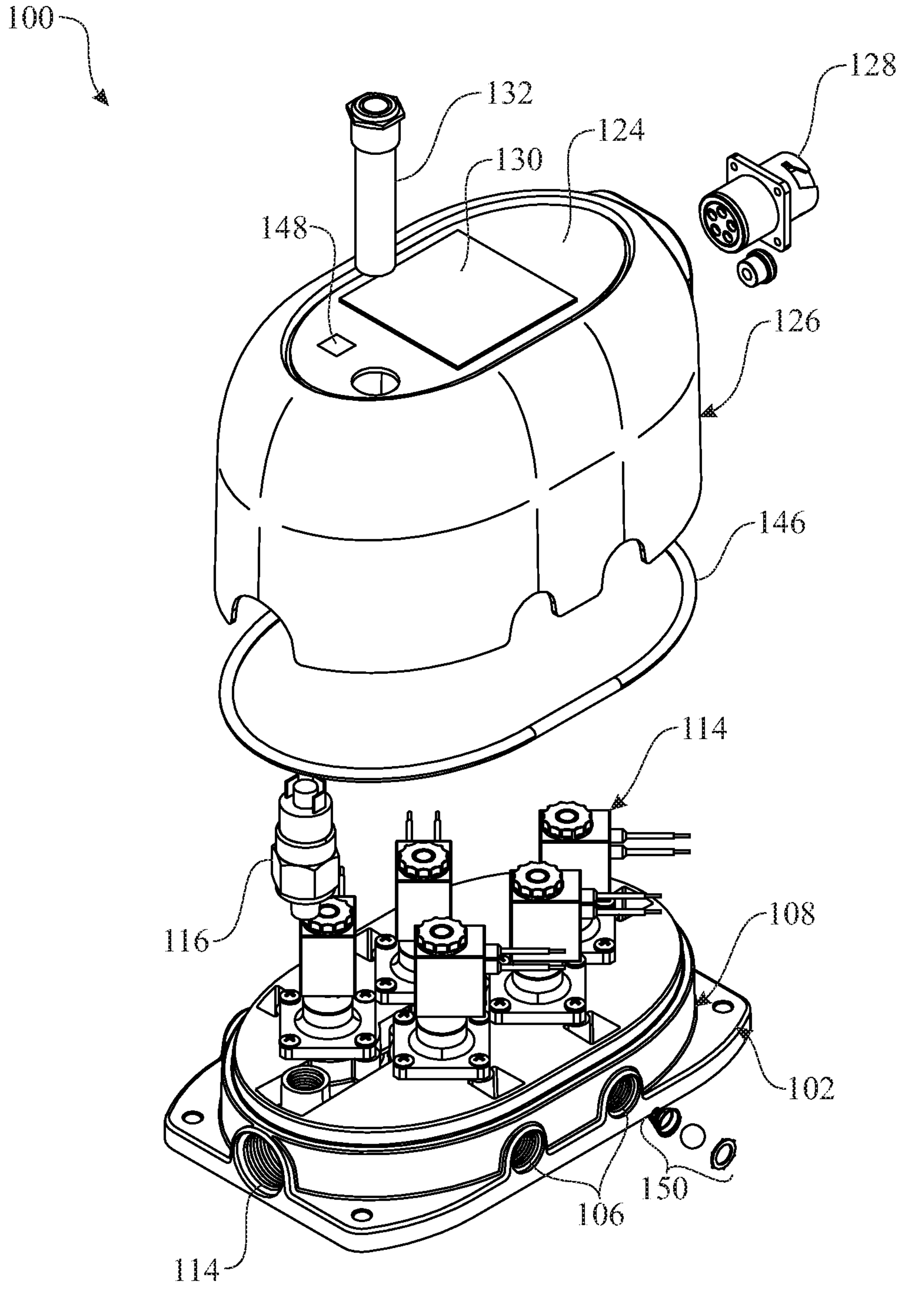
FIG. 7 presents an isometric view of the automated flushing system similar to that of FIG. 6 but after counterclockwise rotation ninety degrees.
Figure 8:
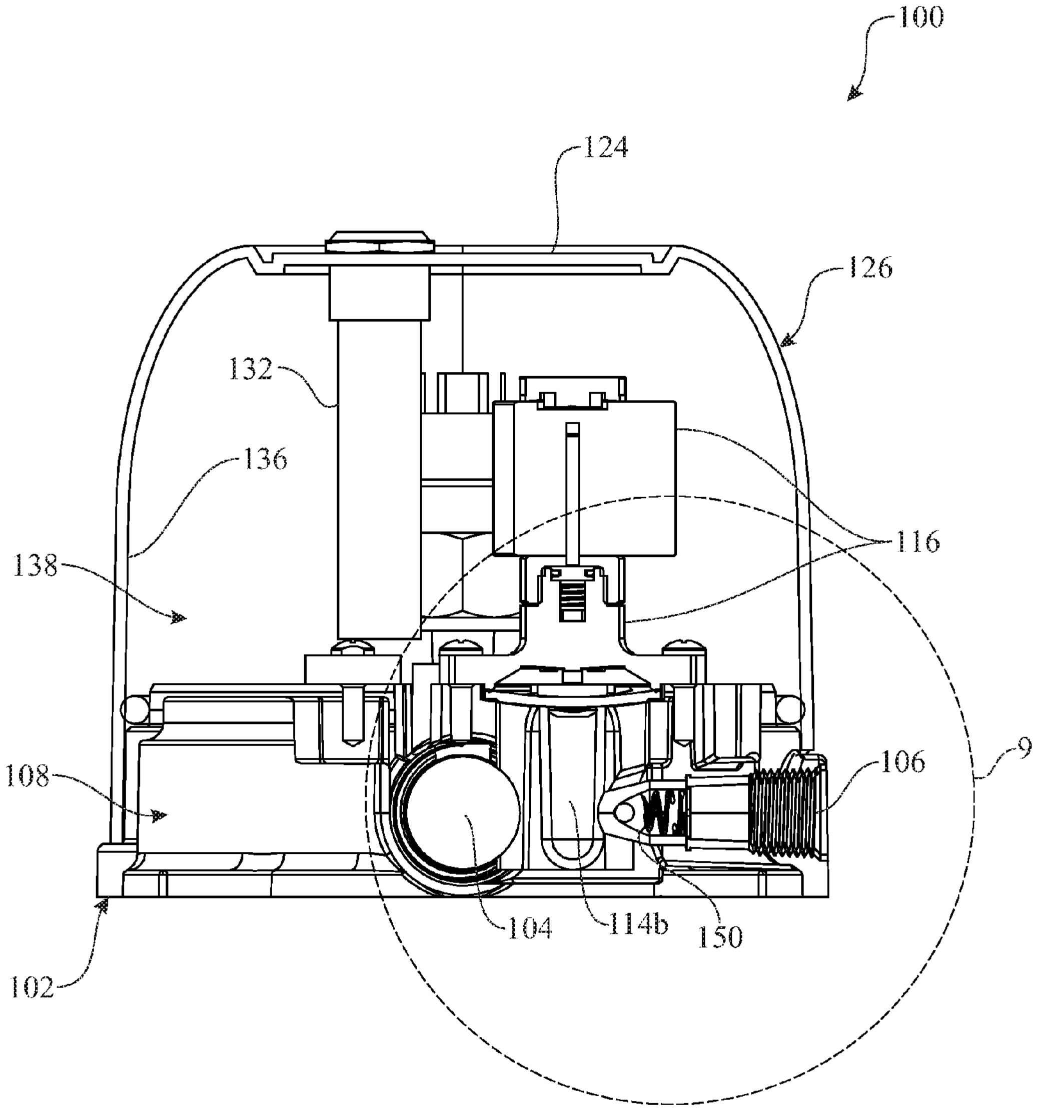
FIG. 8 presents a rear cross-sectional view of the automated flushing system as seen along line 8-8 of FIG. 3.
Figure 9:
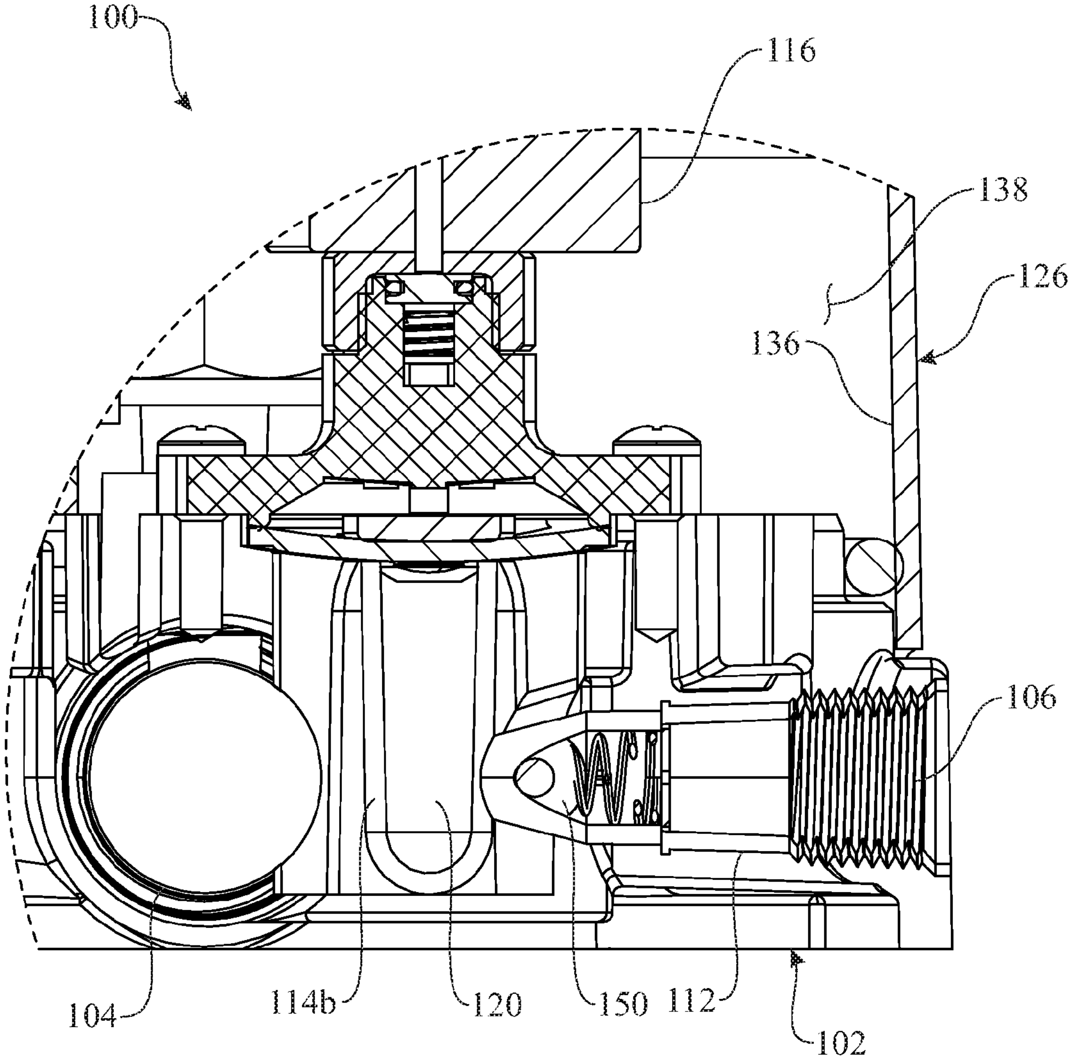
FIG. 9 presents an enlarged rear cross-sectional view of a portion of the automated flushing system encompassed by circle 9 in FIG. 8.
Figure 10:
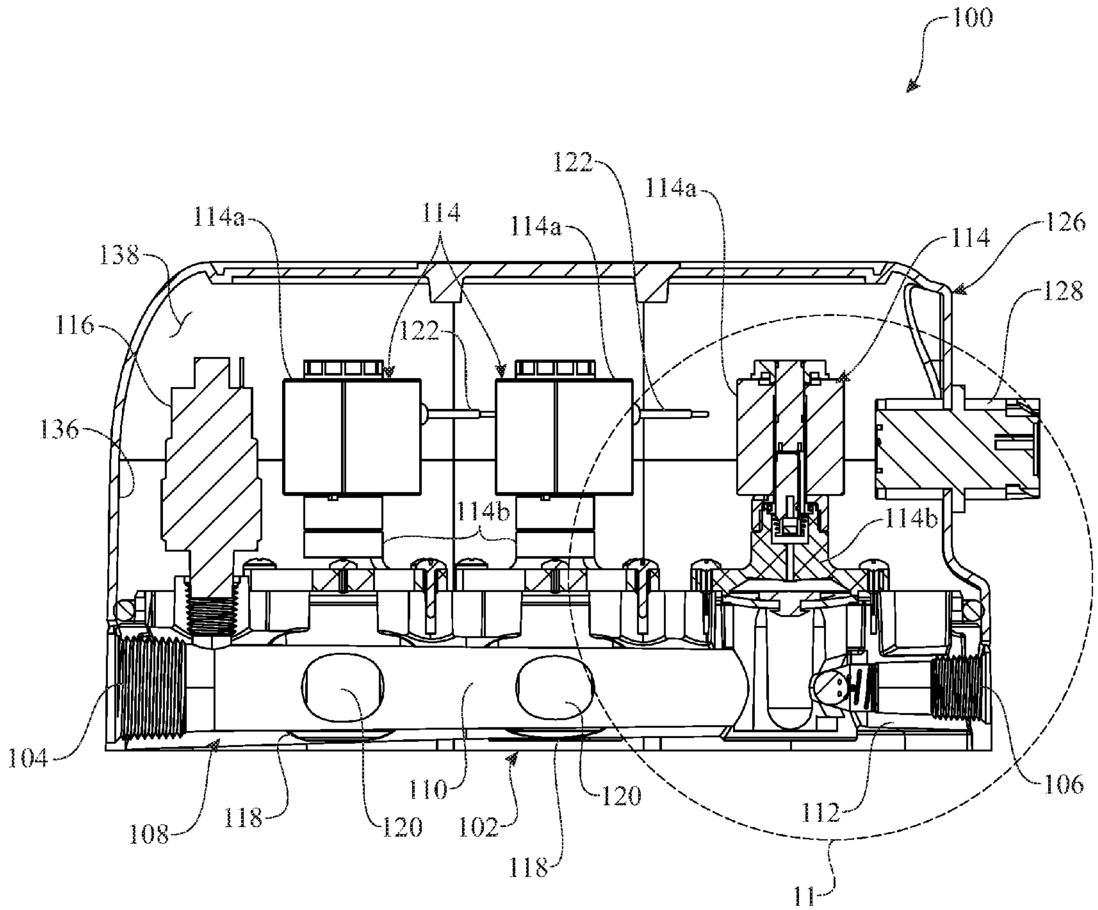
FIG. 10 presents a longitudinal sectional view of the automated flushing system.
Figure 11:
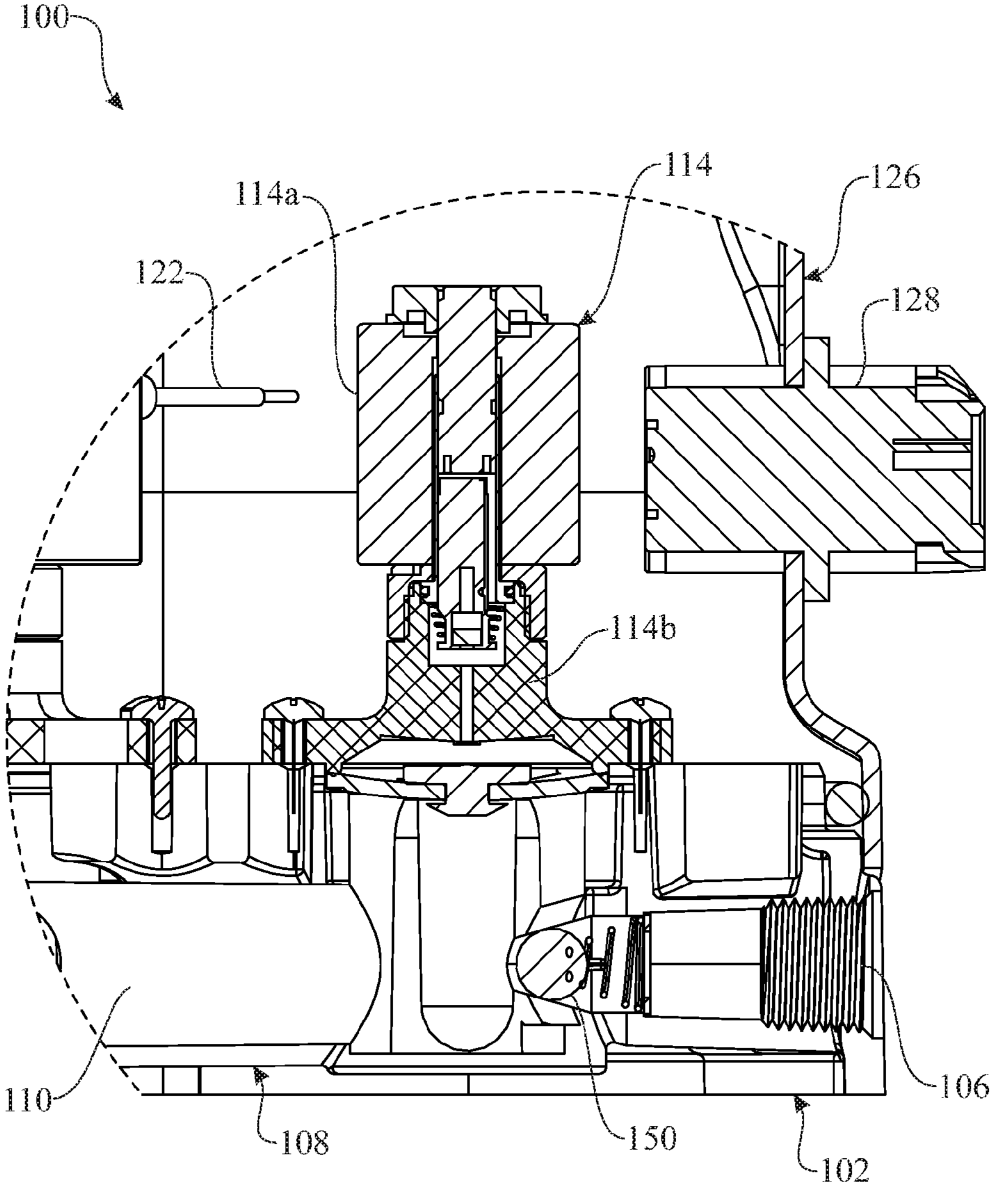
FIG. 11 presents an enlarged longitudinal sectional view of a portion of the automated flushing system encompassed by circle 11 in FIG. 10.

The following detailed description is merely exemplary in nature and is not intended to limit the described embodiments or the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to make or use the embodiments of the disclosure and are not intended to limit the scope of the disclosure, which is defined by the claims. For purposes of description herein, the terms "upper", "lower", "left", "rear", "right", "front", "vertical", "horizontal", and derivatives thereof shall relate to the invention as oriented in FIG. 1. Furthermore, there is no intention to be bound by any expressed or implied theory presented in the preceding technical field, background, brief summary or the following detailed description. It is also to be understood that the specific devices and processes illustrated in the attached drawings, and described in the following specification, are simply exemplary embodiments of the inventive concepts defined in the appended claims. Hence, specific dimensions and other physical characteristics relating to the embodiments disclosed herein are not to be considered as limiting, unless the claims expressly state otherwise.

Referring now to FIGS. 1-11, there is illustrated an exemplary embodiment of an automated flushing system 100 in accordance with aspects of the present invention, being adapted for use, for example, in flushing one or more outboard motors (not shown). The system 100 can flush and clean the cooling system of the outboard motor by rinsing away particles from and preventing salt crystallization in the cooling system. The system 100 provides a user with one place to hook up to a source of water, and one button to push, so that the user has a single interaction point to direct cleansing fresh water to one or more outboard, (or inboard) motors. In the illustrated embodiment, the system 100 can service from one to five motors.

More particularly, the automated flushing system 100 includes a base 102 having a flow inlet 104, a plurality of flow outlets 106, and a manifold 108. The manifold 108 defines a main flow channel 110 connected in flow communication with the flow inlet 104 and extending longitudinally of the base 102 away from the flow inlet 104. The manifold 108 also defines a plurality of auxiliary flow channels 112 interconnecting the main flow channel 110 with respective ones of the flow outlets 106 so as to provide flow communication in parallel to the flow outlets 106 from the main flow channel 110 through respective ones of the auxiliary flow channels 112. The base 102 may be an injection molded component with the manifold 108 formed into it. In the exemplary embodiment, there is a single flow inlet 104 and five flow outlets 106. By way of example but not limitation, the base 102 may be built with a ¾" hose barb at the flow inlet 104 and a ⅜" hose barb at each of the flow outlets 106. To prepare the system 100 for use, the boat water line is plugged off, one hose is run between the hose barb of the flow inlet 104 and the water source and five hoses are run between the hose barbs of the flow outlets 106 and the respective flush ports on the motors.

The automated flushing system 100 also includes a plurality of solenoid valves 114 and a pressure switch 116. The solenoid valves 114 and pressure switch 116 are assembled into the base 102. Each solenoid valve 114 is mounted on the manifold 108 so as to extend into a respective one of the auxiliary flow channels 112. Each solenoid valve 114 may be electrically actuated between an activated status and a deactivated status to respectively allow and block flow communication of a liquid, such as water, through the respective one of the auxiliary flow channels 112 to a respective one of the flow outlets 106. The pressure switch 116 is mounted on the manifold 108 in flow communication with one end of the main flow channel 110 adjacent to the flow inlet 104. The pressure switch 116 is configured to physically sense whether the pressure of the liquid (water) entering the main flow channel 110 from the flow inlet 104 is above a preset minimum pressure as a precondition to electrically initiating operation of the automated flushing system 110. The pressure switch 116 thus prevents initiating operation of any of the solenoid valves when the pressure of the liquid is below the preset minimum.

More particularly, the flow inlet 104 of the base 102 is defined at a first end 102*a* thereof and the plurality of flow outlets 106 are defined at opposite sides 102*b*, 102*c* thereof and also at a second end 102*d* thereof opposite to the first end 102*a*. Thus, the main flow channel 110 is connected at one end to the flow inlet 104 at the first end 102*a* of the base 102 and extends longitudinally of the base toward its second end 102*d*. The manifold 108 also defines a plurality of cavities 118 each paired with a respective one of the auxiliary flow channels 112. Each cavity 118 defines a respective flow-through orifice 120 such that the flow communication provided by each of the auxiliary flow channels 112 also passes through each of the orifices 120 of the cavities 118 paired with the respective auxiliary flow channels.

Each of solenoid valves 114 has an upper portion 114*a* and a lower portion 114*b*. The solenoid valve upper portion 114*a* extends above a respective one of the cavities 118 and has a pair of electrical connectors 122 protruding outwardly therefrom. Each solenoid valve lower portion 114*b* extends into the respective one of the cavities 118 and intersects its flow-through orifice 120. Actuation of the upper portion 114*a* of a respective one of the solenoid valves 114, via its electrical connectors 122, shifts the upper portion 114*a* between the activated status and deactivated status and causes the lower portion 114*b* to correspondingly open and close the respective one of the flow-through orifices 120.

The automated flushing system 100 further includes a control panel 124 and a cover 126. The control panel 124 is either mounted into the top of the cover 126 or nearby on the boat and in electrical communication with the components of the system 100 via an electrical coupler 128. The control panel 124 includes a timer control unit 130 and a start switch 132, such as a momentary push-button type switch. The start switch 132 is use to start the operation cycle of the timer control unit 130 and thus the sequence of operation of the solenoid valves 114. The start switch 132 may be either the aforementioned momentary push-button type switch mounted on the cover 126 or remotely located such as at a dash, bulkhead, etc., incorporated into the bulkhead water connection.

The cover 126 may be in the form of an injection molded shell, having a peripherally-extending bottom rim 134 and an inside surface 136 defining a hollow interior 138. The cover 126 is adapted to fit over the manifold 108 of the base 102 and enclose the pressure switch 116 and the solenoid valves 114 in the hollow interior 138, with the bottom rim 134 of the cover 126 resting upon and mating with a peripherally-extending bottom ledge 140 of the base 102. The bottom rim 134 of the cover 126 has a plurality of recesses 142 formed therein. The recesses 142 are spaced apart and semi-circular shaped to accommodate the flow inlet 104 and the flow outlets 106 of the base 102 such that when the bottom rim 134 of the cover 126 rests upon the bottom ledge 140 of the base 102 the bottom rim 134 of the cover 126 overlies the flow inlet 104 and flow outlets 106 of the base. The base 102 also has a lip 144 extending peripherally about the base and defined in spaced relationship above the bottom ledge 140. An O-ring 146 seats upon the lip 144 such that when the bottom rim 134 of the cover 126 is resting upon the bottom ledge 140 of the base 102 a seal is formed between the inside surface 136 of the cover 126 and the O-ring 146. Thus, the cover 126 protects the interior electrical components of the system 100 from falling objects and is sealed to protect them from direct water spray. Also, the bottom ledge 140 of the base 102 is provided with a plurality of peripheral mounting holes 147 at its four corners for receiving fasteners (not shown) to install or mount the system 100 on the boat.

Figure 12:
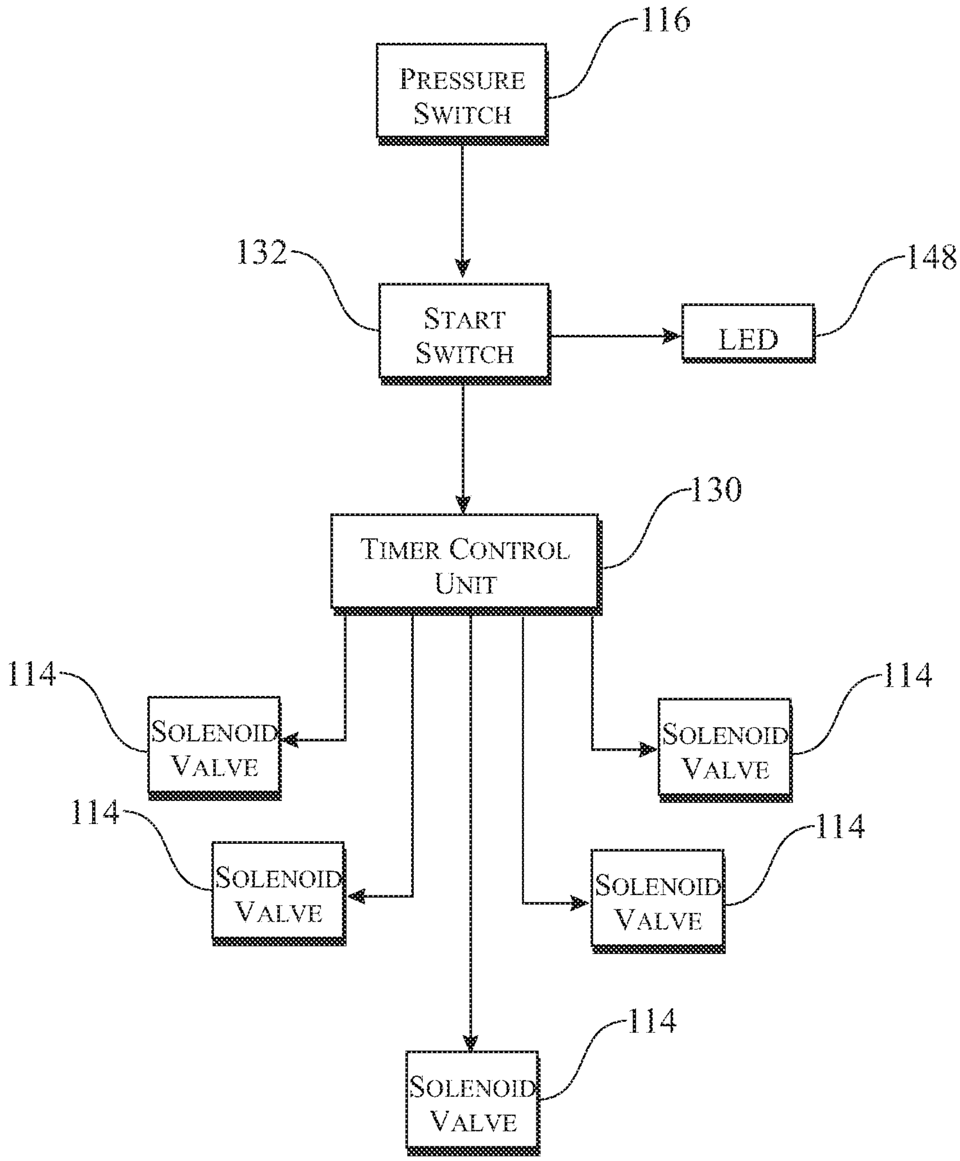
FIG. 12 presents a block diagram of the electrical connections between electrical components of the automated flushing system.

Referring to FIG. 12, there is illustrated a block diagram of the electrical connections between the electrical components of the automated flushing system 100. The solenoid valves 114 individually are electrically connected to timer control unit 130 of the control panel 124 for actuating each of the solenoid valves to an activated status in accordance with a preset sequence. The start switch 132 of the control panel 124 is configured for actuating the timer control unit 130 to initiate each of the solenoid valves 114 to the activated status to initiate operation of the system 100. However, a precondition for the initiation of operation of the system 100 is that the pressure valve 116 senses the liquid, such as water, entering the main flow channel 110 from the flow inlet 104 is at a pressure above a preset minimum pressure. The start switch 132 utilizes an LED 148 to indicate to a user the current operating status of the system 100. These indications may, by way of example but not limitation, be different colors which have specific meanings. For example: (1) Solid Blue—the system 100 has power, at least fifteen psi of water pressure connected, and so the system is ready to begin; (2) Flashing Blue—system 100 is currently in operation; (3) Solid or Flashing Red—the system 100 is in alarm status; and (4) Purple—the system 100 is performing a "short" operation cycle.

To initiate operation of the automated flushing system 100, as explained above the activation of the pressure switch 116 is initially required. If "dry" conditions currently prevail, that is, the water fed to the system 100 from a source thereof is at a pressure presently below a minimum value which, by way of example but not limitation, may be fifteen psi of water pressure, the pressure switch 116 is preset to prevent a user from initiating operation of the system 100. The pressure switch 116 is mechanically or electrically connected in series with the start switch 132 to enable the latter to initiate operation of the system 100 when the water pressure is at or above the preset minimum pressure. The start switch 132 is actuated to initiate operation of the system 100 by starting the timer control unit 130 to cycle through its preset time intervals of the actuation and de-actuation of the solenoid valves 114, that is, the periods when the solenoid valves are open and closed. The timer control unit 130 is setup to allow a single solenoid valve 114 at a time to be open for a desired period, such as, by way of example but not limitation, fifteen minutes. While the one solenoid valve 114 is open and before it is closed, the timer control unit 130 will open the next solenoid valve 114 in the preset sequence when the previous one solenoid valve 114 has only a short period, such as ten seconds, remaining in its open period.

As mentioned above, the system 100 operates with water to flush the outboard motors. By way of example but not limitation, the source of such water may be from either a fresh water tank on board the boat or a deck connection off the boat to the system 100. The water pressure is required to be at a preset minimum, such as fifteen psi, to close the normally open pressure switch 116 of the system 100. This allows the start switch 132 of the system 100 to be actuated to be able to start the sequence of solenoid valve operation that is defined in the timer control unit 130. If there is no water pressure, or the water pressure is below fifteen psi, the system 100 will not operate and the LED 148 of the start switch 132 will display an alarm status on the control panel 124. The LED 148 of the start switch 132 will illuminate red during an alarm status. The LED 148 of the start switch 132 will illuminate solid blue once the appropriate water pressure is connected and the flushing operation can start. The LED 148 of the start switch 132 will illuminate a flashing blue while the operation of the system is ongoing. The control will open the first solenoid valve 114 of the preset sequence for fifteen minutes. As mentioned above, each solenoid valve 114 will be open for fifteen minutes. To avoid the pressure from dropping, the control panel 124 will open the next solenoid valve 114 in the preset sequence while there is ten seconds remaining in the operating period of the previous (currently open) solenoid valve 114. This way of opening the sequence of solenoid valves will repeat for up to five solenoid valves. When the operation cycle has been started the cycle cannot be stopped, unless power is disconnected to the system. The timer control unit 130 is preset to identify the last solenoid valve in the operation cycle (or preset sequence). Once the final solenoid valve has completed its time cycle, it as well as all of the preceding valves will be in a close or deactivated status. The operator may then repeat the operation to spend a longer time on flushing. When the operator is done with flushing of the outboard motors and the system is thus deactivated, all that needs to be done to make sure the system 100 unable to direct water to the motors is to disconnect the water hose hook up to the flow inlet 104 of the system 100. Thereafter, the hose hook ups to the flow outlets 106 will be disconnected also. Also, as seen in FIGS. 6-11, each flow outlet 106 has a check valve assembly 150 associated therewith which prevents back flow of water into the system 100 via any of the flow outlets 106 from the outboard motors.

Figure 13:
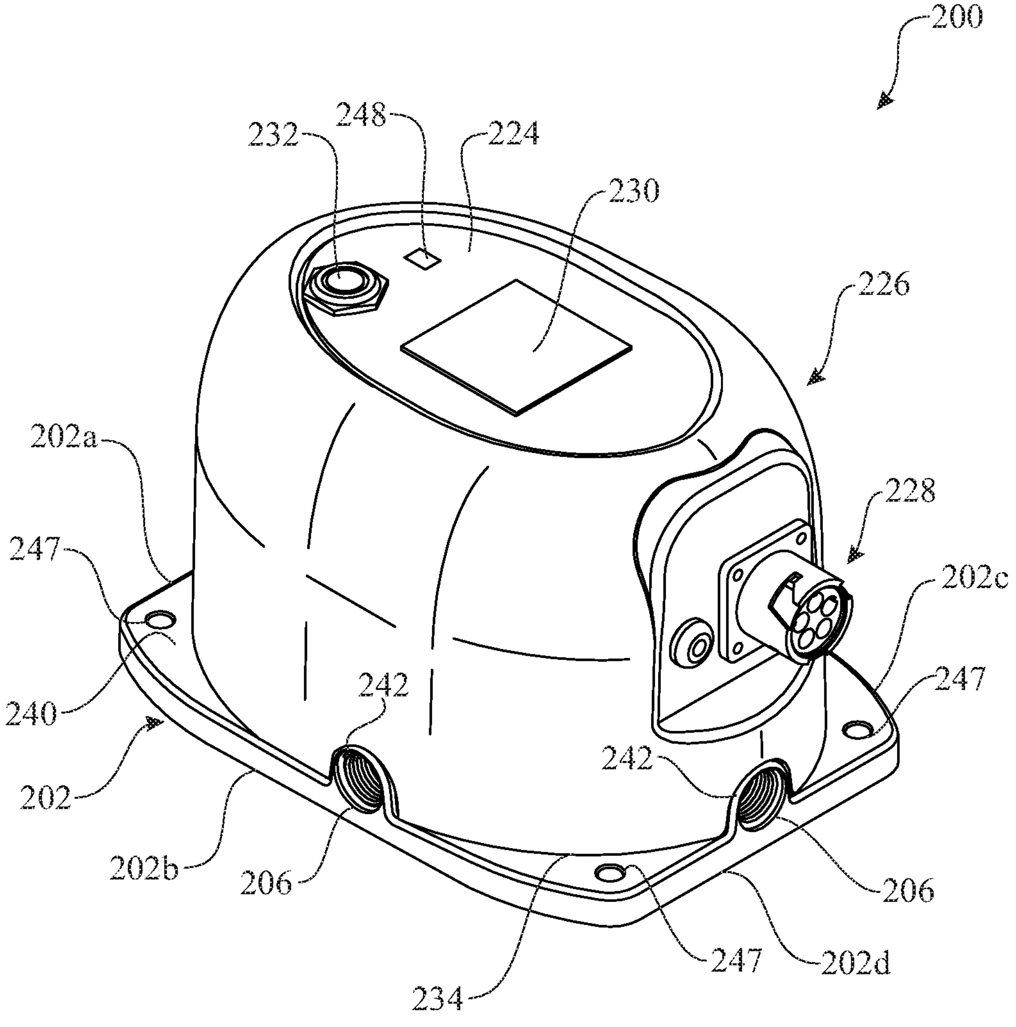
FIG. 13 presents a top isometric view of an alternative exemplary embodiment of an automated flushing system in accordance with aspects of the present invention, being adapted, for example, for flushing one or more outboard motors.

Referring now to FIG. 13, there is illustrated an alternative exemplary embodiment of an automated flushing system, generally designated 200, according to aspects of the present invention. Like features of the automated flushing system 100, as seen in FIGS. 1-12, and the automated flushing system 200, as seen in FIG. 13, are numbered the same except preceded by the numeral '2'. For further explanation of these like features in the automated flushing system 200, please refer to the preceding description with reference to the automated flushing system 100. The only significant difference between the automated flushing systems 100 and 200 is that the system 100 can service from one to five motors, whereas the system 200 can service from one to three motors due to elimination of one of a pair of flow outlets 106 (and solenoid valve associated therewith) on each of the opposite sides of the system 200. As a result, the system 200 has an overall physical footprint reduced in size compared to the system 100. The system 200 will better accommodate boats with one to three motors that may not be able to install the system 100 with a larger footprint to accommodate boats with four or five motors. The overall operation of the system 200 is the same as that of the system 100, as described above.

Figure 14:
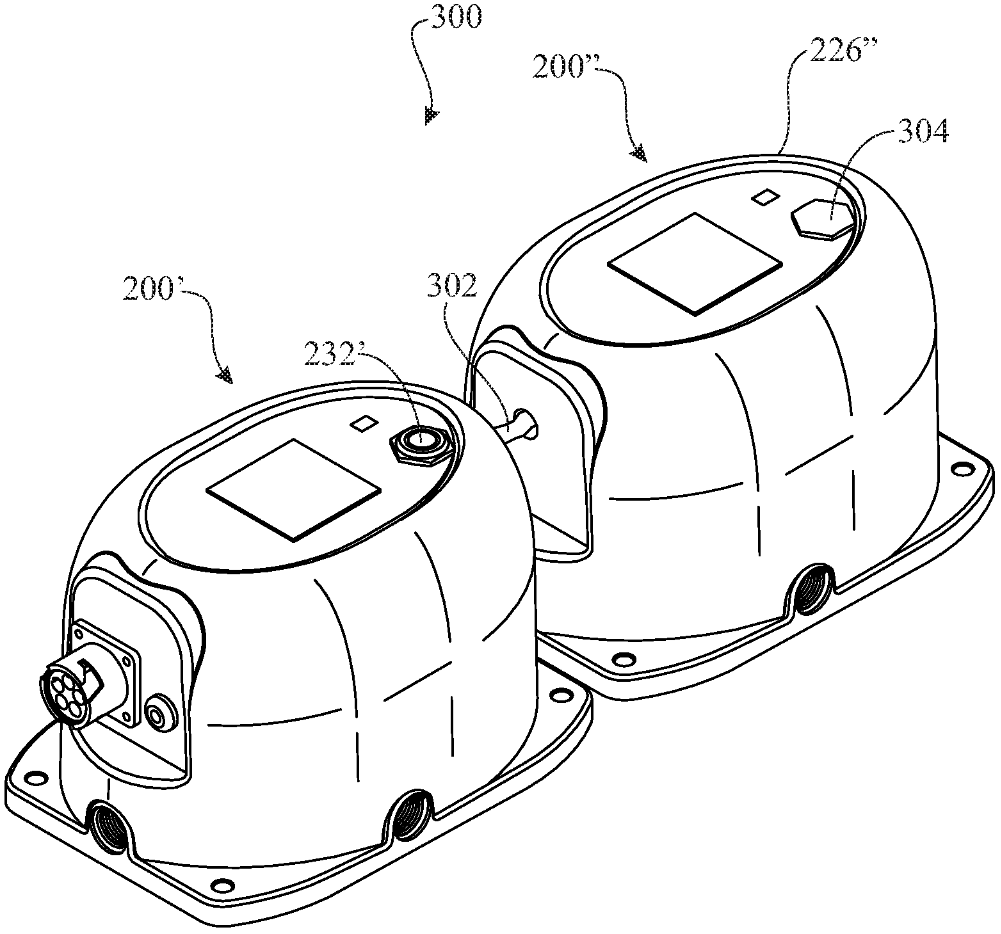
FIG. 14 presents a top isometric view of a pair of the automated flushing systems of FIG. 13 forming an integrated automated flushing system in accordance with aspects of the present invention.

In FIG. 14, there is illustrated an integrated automated flushing system 300, representing an expansion of the capability of the single system 200 that only accommodates boats with one to three motors, by incorporating a pair of the systems 200 being coupled to one another in a series relationship so as to accommodate boats with four or five motors. In the integrated system 300, one system 200' provides a master unit while the other system 200" provides a slave unit in accordance with aspects of the present invention. (The reference numerals with single and double prime symbols are employed to distinguish between various ones of the components of the pair of systems 200 that are shown in FIG. 14.) The slave system 200" contains two solenoid valves which are controlled by the start switch 232' provided only on the master system 200' and connected to the slave system 200" via wiring 302 connecting the two systems. The hole in the cover 226" of the slave system 200" is filled by a plug 304 in the absence of a start switch. Also, only the master system 200' contains the pressure switch, the remote switch connection, and the electrical coupler. Further, the flow inlet of the slave system 200" serve as the inlet of the integrated system 300 and its outlet opposite to the inlet is connected by an adapter to the flow inlet of the master system 200'.

The above-described embodiments are merely exemplary illustrations of implementations set forth for a clear understanding of the principles of the invention. Many variations, combinations, modifications or equivalents may be substituted for elements thereof without departing from the scope of the invention. Therefore, it is intended that the invention not be limited to the particular embodiments disclosed as the best mode contemplated for carrying out this invention, but that the invention will include all the embodiments falling within the scope of the appended claims.

What is claimed is:

1. An automated flushing system, comprising:

a base comprising a flow inlet, a plurality of flow outlets, and a manifold comprising a main flow channel connected in flow communication with said flow inlet, and a plurality of auxiliary flow channels interconnecting said main flow channel with respective ones of said flow outlets so as to provide flow communication in parallel to said flow outlets from said main flow channel through respective ones of said auxiliary flow channels;

a plurality of solenoid valves each mounted on said manifold so as to extend into a respective one of said auxiliary flow channels thereof, said each solenoid valve being actuatable between an activated status and a deactivated status to allow and block flow communication of a liquid through said respective one of said auxiliary flow channels to a respective one of said flow outlets;

a pressure switch mounted on said manifold adjacent to and in flow communication with said flow inlet, said pressure switch being configured to sense the pressure of a liquid entering said main flow channel from said flow inlet being above a preset minimum pressure as a precondition to initiating operation of the automated flushing system;

a cover having a bottom rim extending peripherally about said cover, said cover also having an inside surface defining a hollow interior, said cover being adapted to fit over said manifold of said base and enclose said pressure switch and said plurality of solenoid valves in said hollow interior with said bottom rim of said cover resting upon a bottom ledge extending peripherally about said base, wherein said base has a lip extending peripherally about said base and defined in a spaced relationship above said bottom ledge; and an O-ring seated upon said lip of said base such that when said bottom rim of said cover is resting upon said bottom ledge of said base a seal is formed between said inside surface of said cover and said O-ring.

2. The system as recited in claim 1 wherein said flow inlet of said base is defined at a first end of said base and respective ones of said flow outlets are defined at opposite sides of said base and at a second end of said base opposite to said first end.

3. The system as recited in claim 2 wherein said main flow channel at one end is connected to said flow inlet at said first end of said base and extends longitudinally of said base toward said second end of said base.

4. The system as recited in claim 1 wherein said manifold also comprises a plurality of cavities each paired with a respective one of said auxiliary flow channels, each of said cavities defining a respective flow-through orifice such that said flow communication provided by each of said auxiliary flow channels also passes through each of said orifices of said cavities paired with said respective one of auxiliary flow channels.

5. The system as recited in claim 4 wherein each of said solenoid valves has an upper portion extending above a respective one of said cavities and a lower portion extending into said respective one of said cavities and intersecting said flow-through orifice such that actuation of said upper portion of a respective one of said solenoid valves shifts said upper portion between the activated status and deactivated status and causes said lower portion to correspondingly open and close a respective one of said flow-through orifices.

6. The system as recited in claim 1 wherein said bottom rim of said cover has a plurality of recesses formed therein, said recesses being spaced apart and shaped to accommodate said flow inlet and plurality of flow outlets of said base such that when said bottom rim of said cover rests upon said bottom ledge of said base said bottom rim of said cover overlies said flow inlet and plurality of flow outlets of said base.

7. The system as recited in claim 1 further comprising a master unit and a slave unit, each of said units incorporating said base and at least some of said plurality of solenoid valves, said units being coupled to one another in a series relationship such that said flow inlet at one end of said slave unit serves as an inlet for said units and one of said flow outlets of said slave unit at an opposite end from said one end is coupled to said flow inlet of said master unit, and wherein said pressure switch is only incorporated in said master unit for sensing the pressure of the liquid entering said main flow channel from said flow inlet of said master unit being above said preset minimum pressure as a precondition to initiating operation of said automated flushing system.

8. An automated flushing system, comprising:

a base comprising a flow inlet, a plurality of flow outlets, and a manifold comprising a main flow channel connected in flow communication with said flow inlet, and a plurality of auxiliary flow channels interconnecting said main flow channel with respective ones of said flow outlets so as to provide flow communication in parallel to said flow outlets from said main flow channel through respective ones of said auxiliary flow channels;

a plurality of solenoid valves each mounted on said manifold so as to extend into a respective one of said auxiliary flow channels thereof, said each solenoid valve being actuatable between an activated status and a deactivated status to allow and block flow communication of a liquid through said respective one of said auxiliary flow channels to a respective one of said flow outlets;

a pressure switch mounted on said manifold adjacent to and in flow communication with said flow inlet, said pressure switch being configured to sense the pressure of a liquid entering said main flow channel from said flow inlet being above a preset minimum pressure as a precondition to initiating operation of the automated flushing system;

a cover having an inside surface defining a hollow interior and being adapted to fit over said manifold of said base and enclose said pressure switch and said plurality of solenoid valves in said hollow interior with said cover resting upon said base;

a control panel coupled to said pressure switch and said solenoid valves for actuating each of said solenoid valves to the activated status to initiate operation of the automated flushing system in response to said pressure switch sensing the pressure of liquid entering said main flow channel from said flow inlet being above said preset minimum pressure;

a bottom rim extending peripherally about said cover and adapted to rest upon a bottom ledge extending peripherally about said base, wherein said bottom rim of said cover has a plurality of recesses formed therein, said recesses being spaced apart and shaped to accommodate said flow inlet and plurality of flow outlets of said base such that when said bottom rim of said cover rests upon said bottom ledge of said base said bottom rim of said cover overlies said flow inlet and plurality of flow outlets of said base and wherein said base has a lip extending peripherally about said base and defined in a spaced relationship above said bottom ledge; and an O-ring seated upon said lip of said base such that when said bottom rim of said cover is resting upon said bottom ledge of said base a seal is formed between said inside surface of said cover and said O-ring.

9. The system as recited in claim 8 wherein said flow inlet of said base is defined at a first end of said base and respective ones of said flow outlets are defined at opposite sides of said base and at a second end of said base opposite to said first end; and wherein said main flow channel at one end is connected to said flow inlet at said first end of said base and extending longitudinally of said base toward said second end of said base.

10. The system as recited in claim 8 wherein said manifold also comprises a plurality of cavities each paired with a respective one of said auxiliary flow channels, each of said cavities defining a respective flow-through orifice such that said flow communication provided by each of said auxiliary flow channels also passes through each of said orifices of said cavities paired with said respective one of auxiliary flow channels.

11. The system as recited in claim 10 wherein each of said solenoid valves has an upper portion extending above a respective one of said cavities and a lower portion extending into said respective one of said cavities and intersecting said flow-through orifice such that actuation of said upper portion of a respective one of said solenoid valves shifts said upper portion between the activated status and deactivated status and causes said lower portion to correspondingly open and close a respective one of said flow-through orifices.

12. The system as recited in claim 8 further comprising a master unit and a slave unit, each of said units incorporating said base, said cover and at least some of said plurality of solenoid valves, said units being coupled to one another in a series relationship such that said flow inlet at one end of said slave unit serves as an inlet for said units and one of said flow outlets of said slave unit at an opposite end from said one end is coupled to said flow inlet of said master unit; and wherein said pressure switch and said control panel coupled to said pressure switch are only incorporated in said master unit for actuating each of said solenoid valves to the activated status to initiate operation of the automated flushing system in response said pressure switch sensing the pressure of the liquid entering said main flow channel from said flow inlet of said master unit being above said preset minimum pressure.

13. An automated flushing system, comprising:

a base comprising a flow inlet, a plurality of flow outlets, and a manifold comprising a main flow channel connected in flow communication with said flow inlet, and a plurality of auxiliary flow channels interconnecting said main flow channel with respective ones of said flow outlets so as to provide flow communication in parallel to said flow outlets from said main flow channel through respective ones of said auxiliary flow channels;

a plurality of solenoid valves each mounted on said manifold so as to extend into a respective one of said auxiliary flow channels thereof, said each solenoid valve being actuatable between an activated status and a deactivated status to allow and block flow communication of a liquid through said respective one of said auxiliary flow channels to a respective one of said flow outlets;

a pressure switch mounted on said manifold adjacent to and in flow communication with said flow inlet, said pressure switch being configured to sense the pressure of a liquid entering said main flow channel from said flow inlet being above a preset minimum pressure as a precondition to initiating operation of the automated system;

a cover having an inside surface defining a hollow interior and being adapted to fit over said manifold of said base and enclose said pressure switch and said plurality of solenoid valves in said hollow interior with said cover resting upon said base, wherein said cover has a bottom rim extending peripherally about said cover and adapted to rest upon a bottom ledge extending peripherally about said base; and wherein said bottom rim of said cover has a plurality of recesses formed therein, said recesses being spaced apart and shaped to accommodate said flow inlet and plurality of flow outlets of said base such that when said bottom rim of said cover rests upon said bottom ledge of said base said bottom rim of said cover overlies said flow inlet and plurality of flow outlets of said base, and also wherein said base has a lip extending peripherally thereabout and defined in a spaced-apart relationship above said bottom ledge;

an O-ring seated upon said lip of said base such that when said bottom rim of said cover is resting upon said bottom ledge of said base, a seal is created between said inside surface of said cover and said O-ring;

a timer control coupled to said solenoid valves for actuating each of said solenoid valves to the activated status in accordance with a preset sequence; and a start switch being actuatable to initiate operation of the automated flushing system in accordance with said preset sequence of said activated status of said solenoid valves in response to said pressure switch sensing the pressure of the liquid entering said main flow channel from said flow inlet to be above said preset minimum pressure.

14. The system as recited in claim 13 wherein said flow inlet of said base is defined at a first end of said base and respective ones of said flow outlets are defined at opposite sides of said base and at a second end of said base opposite to said first end; and wherein said main flow channel at one end is connected to said flow inlet at said first end of said base and extending therefrom longitudinally of said base toward said second end of said base.

15. The system as recited in claim 13 wherein said manifold also comprises a plurality of cavities each paired with a respective one of said auxiliary flow channels, each of said cavities defining a respective flow-through orifice such that said flow communication provided by each of said auxiliary flow channels also passes through each of said orifices of said cavities paired with said respective one of auxiliary flow channels.

16. The system as recited in claim 15 wherein each of said solenoid valves has an upper portion extending above a respective one of said cavities and a lower portion extending into said respective one of said cavities and intersecting said flow-through orifice such that actuation of said upper portion of a respective one of said solenoid valves shifts said upper portion between the activated status and deactivated status and causes said lower portion to correspondingly open and close a respective one of said flow-through orifices.

* * * * *